United States Patent
Thommana et al.

(10) Patent No.: US 8,938,202 B1
(45) Date of Patent: Jan. 20, 2015

(54) SYSTEM AND METHOD FOR REDUCING OPERATIONAL POWER AND WEIGHT OF AN UNMANNED AERIAL DEVICE'S PAYLOAD

(75) Inventors: John Thommana, Cedar Rapids, IA (US); Roy Moore, Cedar Rapids, IA (US); Raja Kambhampati, Murphy, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 868 days.

(21) Appl. No.: 12/567,307

(22) Filed: Sep. 25, 2009

(51) Int. Cl.
*H04B 1/40* (2006.01)

(52) U.S. Cl.
USPC .......................................................... 455/74

(58) Field of Classification Search
USPC .................... 455/85, 88, 552.1, 62, 67.11
See application file for complete search history.

(56) References Cited

U.S. PATENT DOCUMENTS

| | | | |
|---|---|---|---|
| 6,230,007 B1* | 5/2001 | Archambeault | 455/425 |
| 6,920,342 B2* | 7/2005 | Reiner | 455/574 |
| 7,233,770 B2* | 6/2007 | Williamson et al. | 455/7 |
| 7,388,483 B2* | 6/2008 | Welles et al. | 340/539.22 |
| 2006/0199531 A1* | 9/2006 | Williamson et al. | 455/11.1 |
| 2006/0265491 A1* | 11/2006 | Litwin | 709/224 |
| 2009/0215385 A1* | 8/2009 | Waters et al. | 455/1 |

* cited by examiner

*Primary Examiner* — Ankur Jain
(74) *Attorney, Agent, or Firm* — Angel N. Gerdzhikov; Donna P. Suchy; Daniel M. Barbieri

(57) ABSTRACT

A system for reducing operational power and weight of an unmanned aerial device's payload may include a frequency detection sensor for detecting a radio frequency signal within a first frequency range. A modulation detection and waveform classification module may be coupled to the frequency detection sensor for detecting a communication type associated with the first frequency range upon the frequency detection sensor detecting the radio frequency signal within the first frequency range. A radio may be coupled to the modulation detection and waveform classification module for transmitting the radio frequency signal, the radio frequency signal may include the communication type. The radio may be inactive until detection of the radio frequency signal, and the radio may be activated upon detection of the radio frequency signal.

20 Claims, 8 Drawing Sheets

SYSTEM AND METHOD FOR REDUCING OPERATIONAL POWER AND WEIGHT OF AN UNMANNED AERIAL DEVICE'S PAYLOAD

TECHNICAL FIELD

The present disclosure generally relates to the field of radio frequency communication, and more particularly to a system and method for increasing operational power and/or weight of an unmanned aerial device's payload.

BACKGROUND

Unmanned aerial devices provide important services to military operations. One important service includes providing data link and voice bridging capabilities to military personnel in the field.

However, an unmanned aerial device's mission time may be reduced due to inefficient operational power use and/or payload weight management.

SUMMARY

A system for reducing operational power and/or weight of an unmanned aerial device's payload may include a frequency detection sensor for detecting a radio frequency signal within a first frequency range. A modulation detection and waveform classification module may be coupled to the frequency detection sensor for detecting a communication type associated with the first frequency range upon the frequency detection sensor detecting the radio frequency signal within the first frequency range. A radio may be coupled to the modulation detection and waveform classification module for receiving and transmitting the radio frequency signal, the radio frequency signal may include the communication type. The radio may be inactive until detection of the radio frequency signal, and the radio may be activated upon detection of the radio frequency signal.

A system may further include an unmanned aerial device. A frequency detection sensor may be coupled to the unmanned aerial device. The frequency detection sensor may detect a radio frequency signal within a first frequency range. A modulation detection and waveform classification module may be coupled to the frequency detection sensor. The modulation detection and waveform classification module may detect a communication type associated with the first frequency range upon the frequency detection sensor detecting the radio frequency signal within the first frequency range. A radio may be coupled to the modulation detection and waveform classification module. The radio may receive and transmit the radio frequency signal, the radio frequency signal may include the communication type. The radio may be inactive until detection of the radio frequency signal. The radio may be activated upon detection of the radio frequency signal.

A method for reducing operational power and/or weight of an unmanned aerial device's payload may include detecting a radio frequency signal within a first frequency range via a frequency detection sensor. The method may further include detecting a communication type associated with the first frequency range via a modulation detection and waveform classification module upon the frequency detection sensor detecting radio frequency signal within the first frequency range. The method may further include activating a radio upon detection of a transmission of a communication with the first frequency range, the first frequency range including the communication type. Finally, the method may include transmitting the radio frequency signal via the radio, the radio frequency signal including the communication type.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

The present disclosure is directed to a system and method for reducing operational power and/or weight of an Interim Gateway Airborne Gateway payload.

Figure 1:
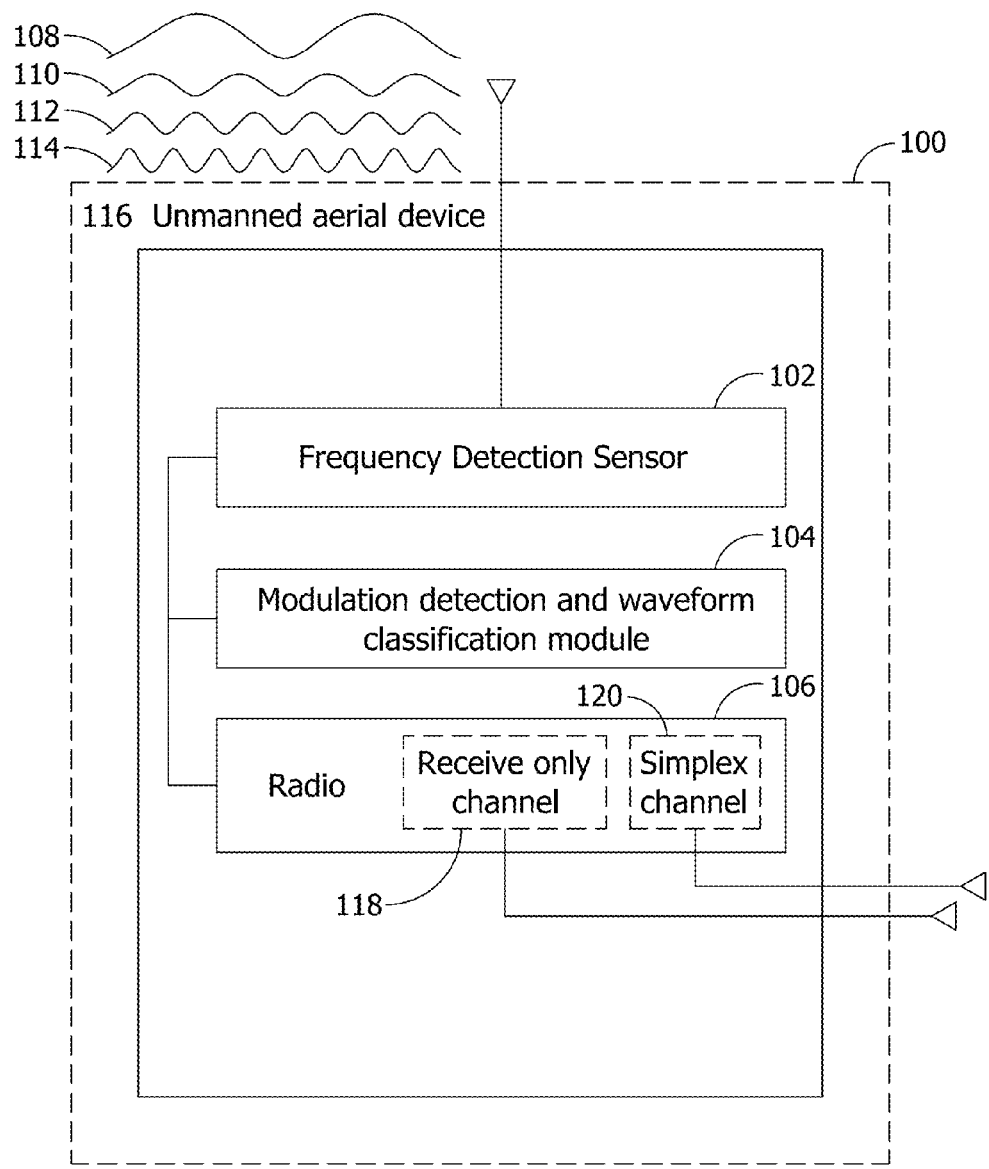
FIG. 1 is a block diagram illustrating a system for reducing operational power and/or weight of an unmanned aerial device's payload in accordance with an embodiment of the present disclosure.

Referring to FIG. 1, a block diagram of a system for reducing operational power and/or weight of an unmanned aerial device's payload is illustrated. A system 100 may include a frequency detection sensor 102. The frequency detection sensor 102 may detect a radio frequency signal within a first frequency range. The first frequency range may include Frequency Band 108, Frequency Band 110, Frequency Band 112, and Frequency Band 114. The frequency detection sensor 102 may continuously scan a frequency range from approximately 1.5 MHz to approximately 2.5 GHz.

It is contemplated that Frequency Band 108 may include a frequency range of approximately 30-88 MHz. It is contemplated that Frequency Band 110 may include a frequency range of approximately 118-136 MHz. It is contemplated that Frequency Band 112 may include a frequency range of approximately 225-512 MHz. It is contemplated that Frequency Band 114 may include a frequency range of approximately 960-1206 MHz. A Frequency Band may have a number of communication types associated with that band. It is contemplated that multiple antennas may be utilized to cover the entire first frequency range.

Upon detection of a radio frequency signal within the first frequency range by the frequency detection sensor 102, a modulation detection and waveform classification module 104 may detect a communication type associated with the first frequency range. The modulation detection and waveform classification module 104 may be coupled or integrated with the frequency detection sensor 102.

It is contemplated that upon a detection of a radio frequency signal in Frequency Band 108, the modulation detection and waveform classification module 104 may detect or look for a communication type including at least one of VHF FM and SINCGARS. It is contemplated that upon a detection of a radio frequency signal in Frequency Band 110, the modulation detection and waveform classification module 104 may detect or look for a communication type including at least one of VHF AM and air traffic control (ATC) communication. It is contemplated that upon a detection of a radio frequency signal in Frequency Band 112, the modulation detection and waveform classification module 104 may detect or look for a communication type including at least one of UHF AM, HAVEQUICK I, HAVEQUICK II, and Enhanced Position Location Reporting System (EPLRS). It is contemplated that upon a detection of a radio frequency signal in Frequency Band 114, the modulation detection and waveform classification module 104 may detect or look for a communication type including Link-16.

The modulation detection and waveform classification module 104 may detect a communication type by extracting at least one of: a bandwidth, a center frequency, or a first and a second cumulant of a waveform associated with the communication type. The first and second cumulant may include: mean and variance of the time domain signal and spectrum, time difference, and time difference of the spectrum of the waveform signal.

It is contemplated that the modulation detection and waveform classification module 104 may model at least one of: the bandwidth, the center frequency, or the first and the second cumulant of the waveform associated with the communication type using a Gaussian mixture model (GMM) during the training phase. The GMM parameters may be estimated by an Expectation-Maximization approach.

The frequency detection sensor 102 may detect a radio frequency signal or waveform during a testing phase. The frequency detection sensor 102 may classify the radio frequency signal by computing at least one of: the bandwidth, the center frequency, or the first and the second cumulant of the radio frequency signal. The frequency detection sensor 102 may then compare the computation with the stored GMM parameters using the Bayes approach. The radio frequency signal is classified as the radio frequency signal that falls within the maximum likelihood. If the likelihood value is below a predefined threshold, the detected radio frequency is classified as an unknown radio signal and at least one of: the bandwidth, the center frequency, or the first and the second cumulant of the unknown radio frequency signal is collected and stored. When enough features (e.g. bandwidth, center frequency, first and second cumulants) are accumulated, the modulation detection and waveform classification module 104 may train a GMM for the unknown radio frequency signal class on the fly.

A radio 106 may transmit or receive the radio frequency signal. The radio 106 may be coupled with the modulation detection and waveform classification module 104. The radio frequency signal may include or carry the communication type.

The radio 106 may initially be inactive or in a powered down state until the detection of a radio frequency signal. The system 100 may activate or power up the radio 106 upon detection of a radio frequency signal. The system 100 may configure the radio 106 to look or detect for net synchronization upon activation.

It is contemplated that the radio 106 may further include a receive only channel 118 and a simplex channel 120. The receive only channel 118 may be configured to receive a radio frequency signal. The radio frequency signal may include the communication type. The simplex channel 120 may be configured to retransmit the radio frequency channel received by the receive only channel. These two channels may support range extension/bridging capabilities of the radio frequency signals.

It is contemplated that the radio 106 may remain active as long as the frequency detection sensor 102 detects a radio frequency signal. Upon the termination or cessation of the radio frequency signal, the radio 106 may return to an inactive state after a predetermined duration. The predetermined duration may be a time period preprogrammed into system 100 by a user or a manufacturer.

It is contemplated that the frequency detection sensor 102 may be a XG Sensor. The XG Sensor may include a processing unit, a system memory, and antenna configured to receive radio frequency signals. The XG Sensor is manufactured and available through Rockwell Collins, Inc. The radio 106 may be a RT-1939(C) communication device, also available through Rockwell Collins, Inc.

The modulation detection and waveform classification module 104 may be implemented as a computer program product residing in the frequency detection sensor 102. The computer program product may comprise a set of computer executable instructions, such as program modules, that may be executed by the processing unit of the frequency detection sensor 102.

Further, it is contemplated that system 100 may be implemented utilizing cognitive radio technology. Cognitive radio technology may optimize the use of the radio frequency spectrum. The cognitive radio technology may intelligently detect which radio frequencies or communication channels are in use and which are not. It is contemplated that frequency detection sensor 102 may scan a first frequency band and then may classify the first frequency band or specific frequency band of interest into a white (unoccupied), grey (partially occupied), and black (totally occupied) areas. The frequency detection sensor 102 then may send or transmit digitized contents of the grey and black areas of the first frequency band to the modulation detection and waveform classification module 104. This may allow the modulation detection and waveform classification module 104 to only decode frequency bands that are currently being occupied. For example, the frequency detection sensor 102 may detect a radio frequency signal within Frequency Band 108 and Frequency Band 110. The frequency detection sensor 102 may send or transmit digitized contents of Frequency Band 108 and Frequency Band 110 to the modulation detection and waveform classification module 104. The modulation detection and waveform classification module 104 may then detect a communication type associated with Frequency Band 108 (e.g SINCGARS). The modulation detection and waveform classification module 104 may also detect a communication type associated with Frequency Band 110 (e.g. ATC communication).

Upon detection of a communication type, the modulation detection and waveform classification module 104 may be configured to power on a radio 106. The modulation detection and waveform classification module 104 may then configure the radio 106 to search for a communication type associated the first frequency band. The radio 106 may also be configured to search for a communication type associated with the first frequency band via a net identifier and a transec hopping key. The radio 106 may also be configured to logon to the net associated with the net identifier to bridge or relay the communication type associated with the first frequency band.

It is contemplated that the system 100 may be coupled or integrated onto an unmanned aerial device 116. The unmanned aerial device may include a MQ-9B Reaper, a RQ-4 Global Hawk, A160 Hummingbird, and the like.

One skilled in the art will recognize that the present disclosure may increase operational power efficiency. The present disclosure only activates a radio 106 upon the detection of a radio frequency signal and specific waveform of interest by the frequency detection sensor 102.

One skilled in the art will also recognize that the present disclosure may decrease an unmanned aerial device's 116 payload weight. Prior to the utilization of RT-1939(C), two ARC-210 radios may have been needed for range extension/bridging capabilities of the radio frequency signals. Only one RT-1939(C), the RT-1939(C) configured with a receive only channel 118 and a simplex channel 120, may be needed for range extension/bridging capabilities of the radio frequency signals.

Figure 2:
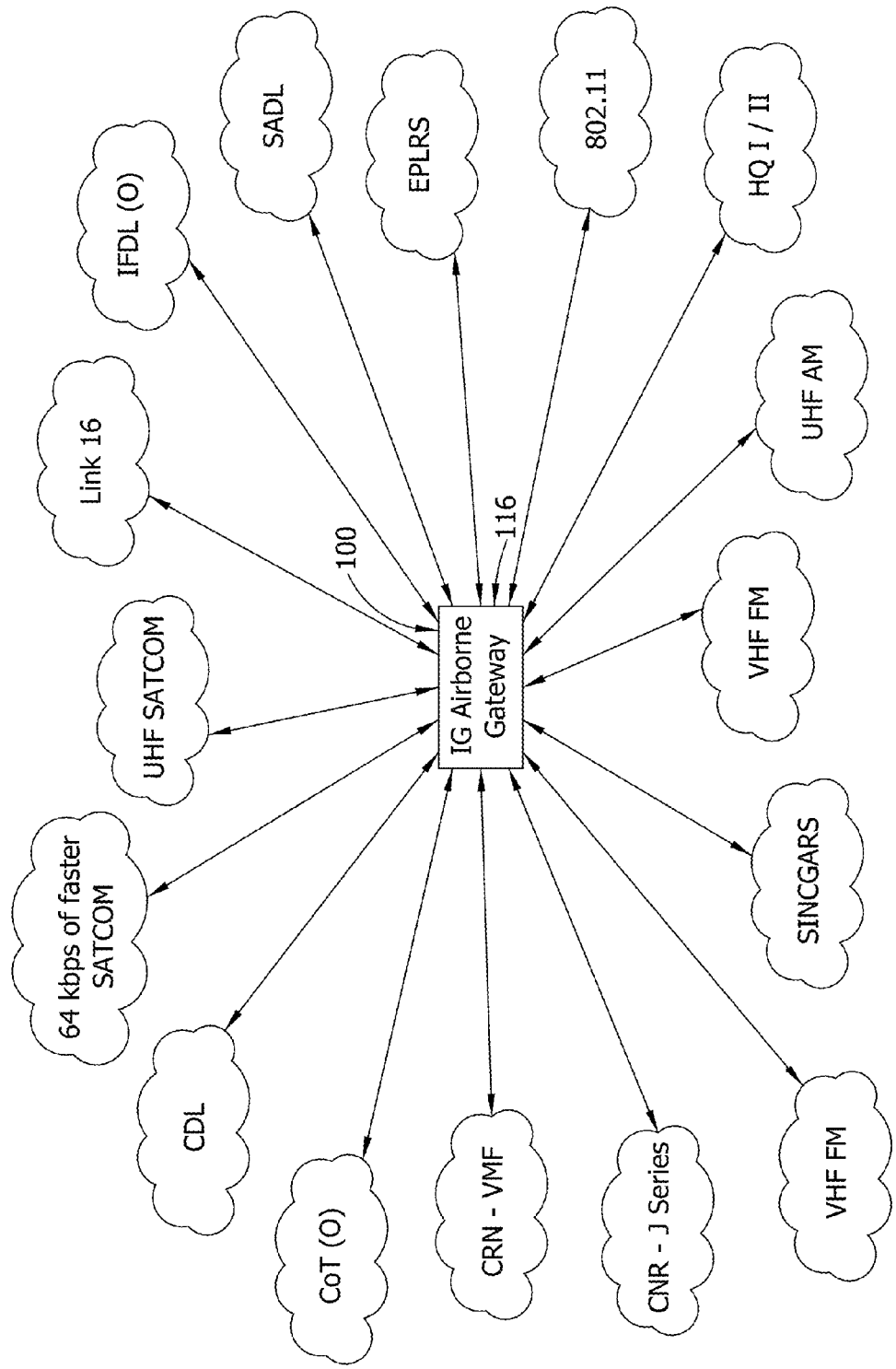
FIG. 2 is an environmental diagram illustrating a possible embodiment of the present disclosure.

FIG. 2 illustrates an environmental view illustrating a possible embodiment of the present disclosure. An unmanned aerial device 116 may be configured with system 100. The system 100 may receive and transmit a number of radio frequency signals, the radio frequency signals including a number of communication types, as illustrated in FIG. 2.

Figure 3:
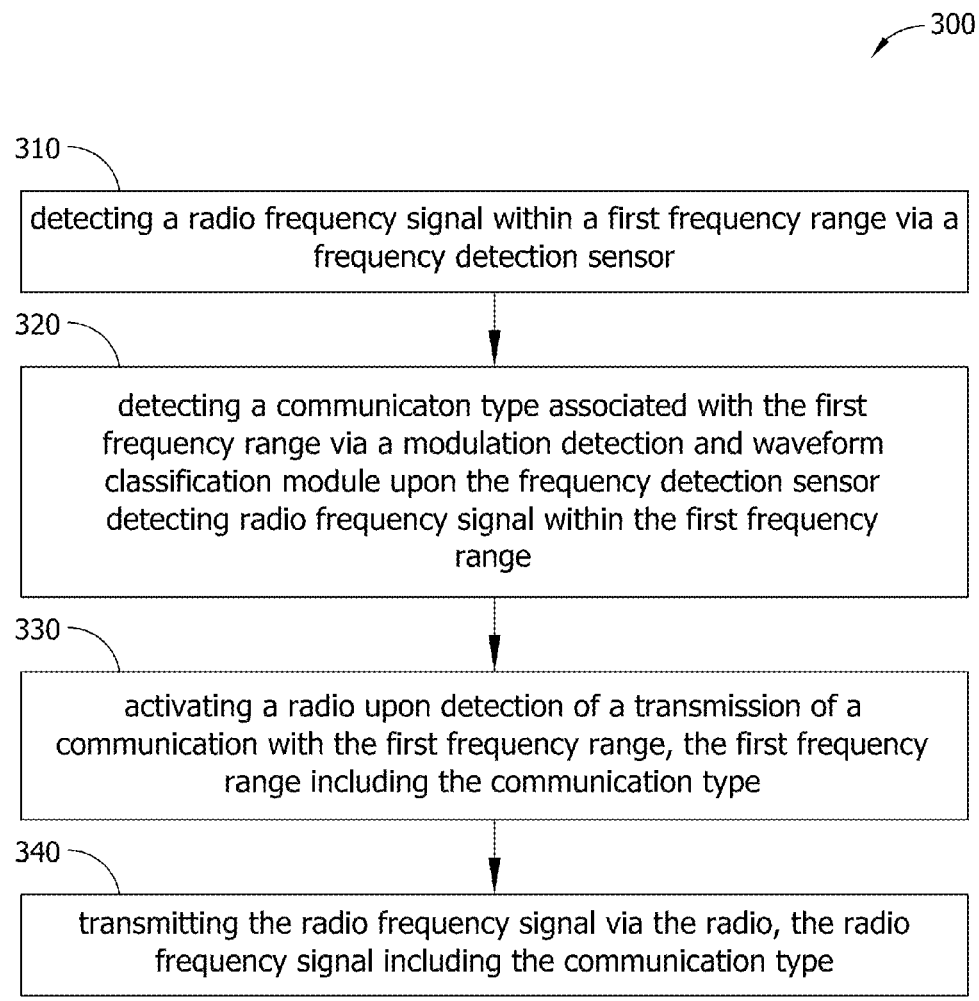
FIGS. 3-8 are flow diagrams illustrating a method for reducing operational power and weight of an unmanned aerial device's payload in accordance with embodiments of the present disclosure.

Referring to FIG. 3, a method for reducing power and weight consumption of an unmanned aerial device's payload 300 is illustrated. The method 300 may include detecting a radio frequency signal within a first frequency range via a frequency detection sensor 310. The method 300 may include detecting a communication type associated with the first frequency range via a modulation detection and waveform classification module upon the frequency detection sensor detecting radio frequency signal within the first frequency range 320. The method may include activating a radio upon detection of a transmission of a communication with the first frequency range, the first frequency range including the communication type 330. The method 300 may include transmitting the radio frequency signal via the radio, the radio frequency signal including the communication type 340.

Figure 4:
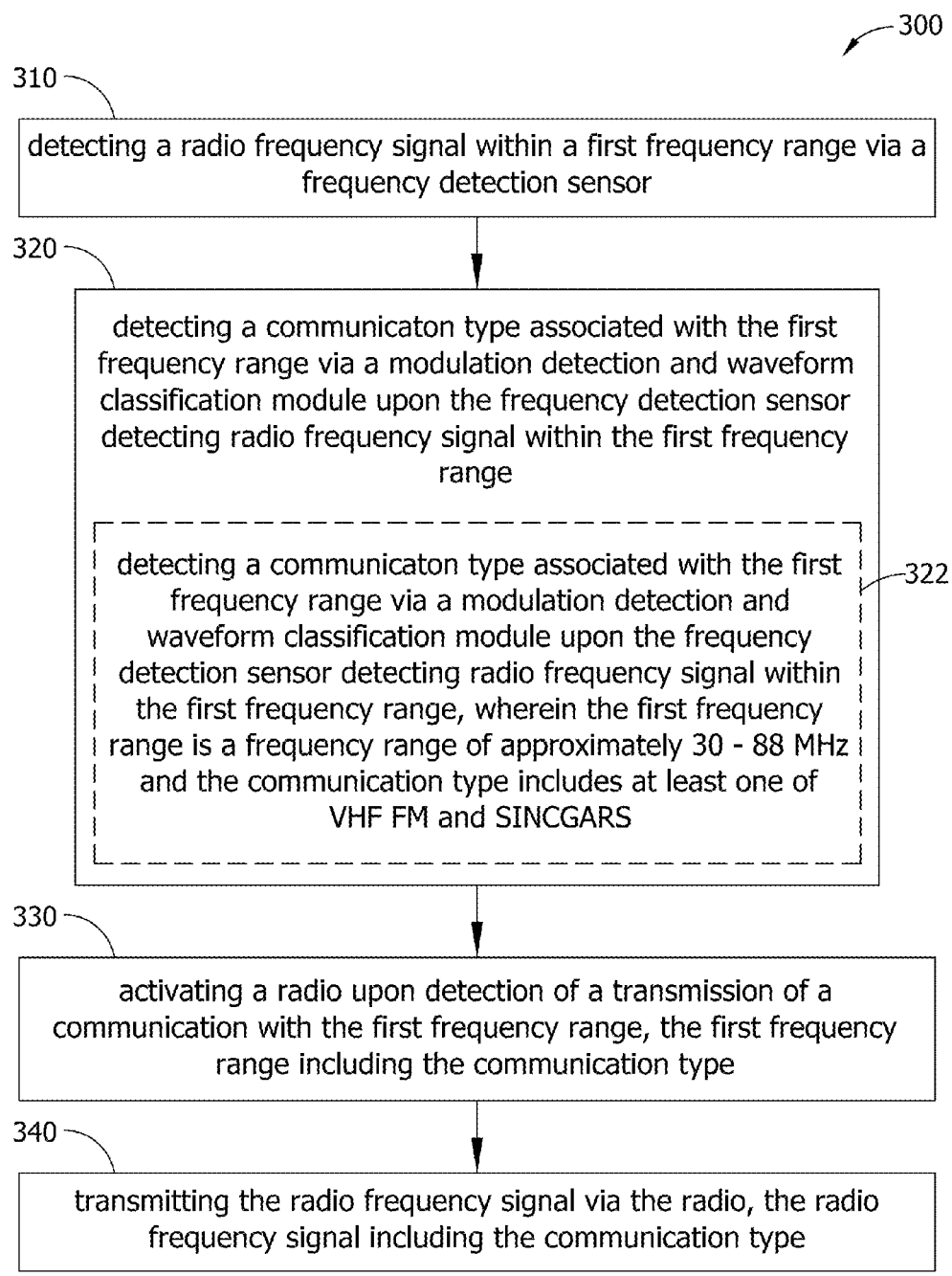

Referring to FIG. 4, the method 300 may further include detecting a communication type associated with the first frequency range via a modulation detection and waveform classification module upon the frequency detection sensor detecting radio frequency signal within the first frequency range, wherein the first frequency range is a frequency range of approximately 30-88 MHz and the communication type includes at least one of VHF FM and SINCGARS 322.

Figure 5:
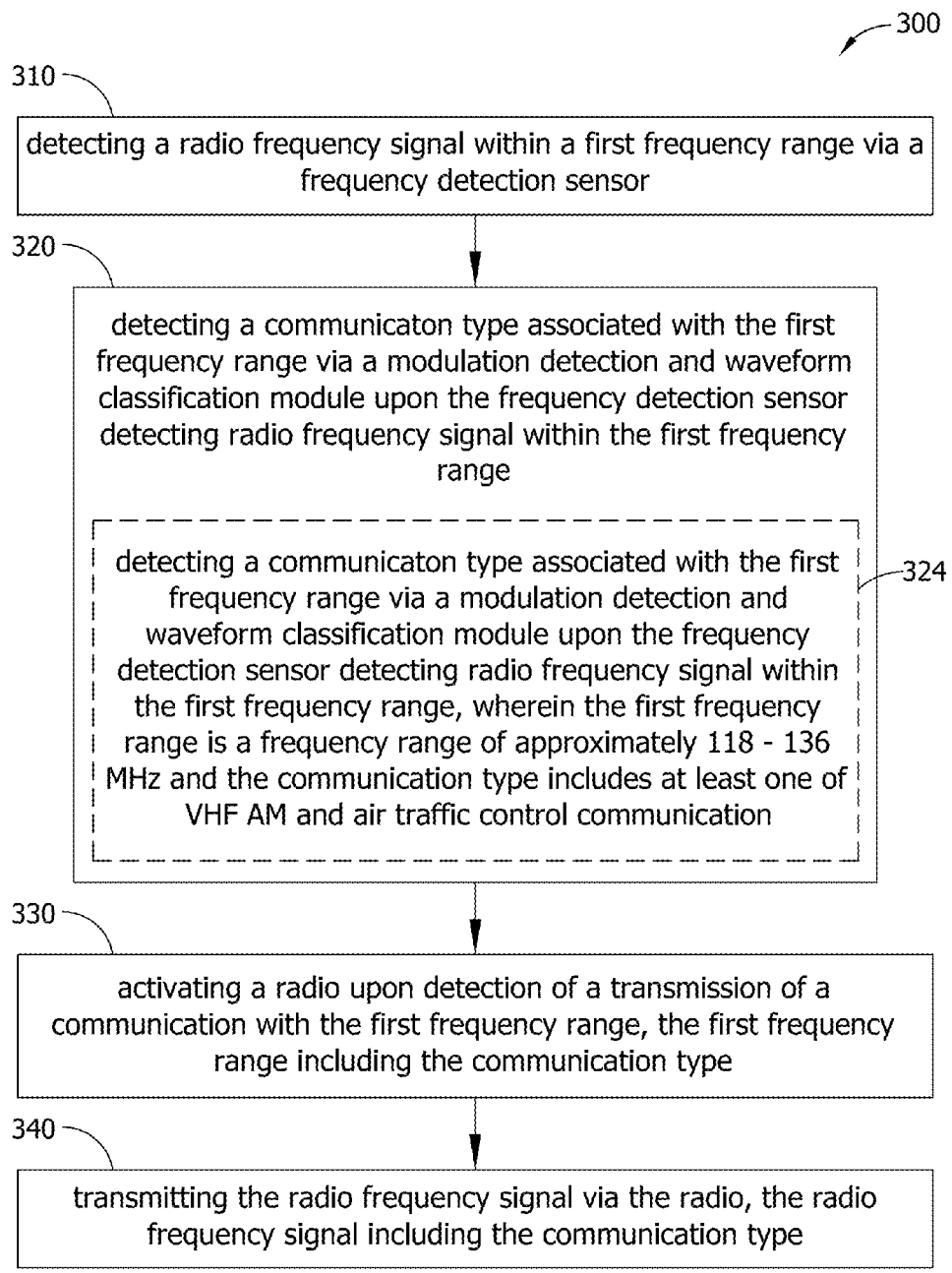

Referring to FIG. 5, the method 300 may further include detecting a communication type associated with the first frequency range via a modulation detection and waveform classification module upon the frequency detection sensor detecting radio frequency signal within the first frequency range, wherein the first frequency range is a frequency range of approximately 118-136 MHz and the communication type includes at least one of VHF AM and air traffic control (ATC) communication 324.

Figure 6:
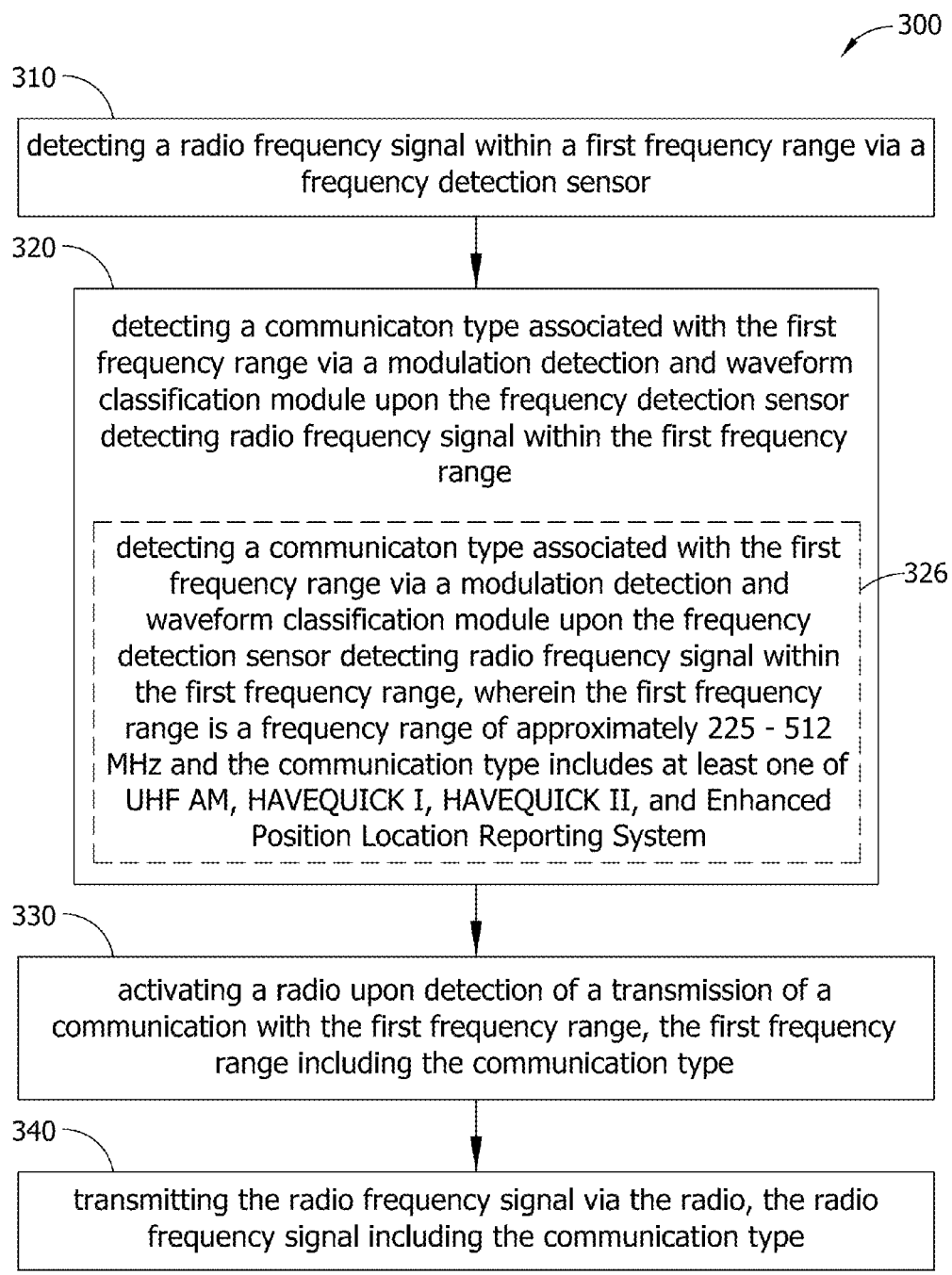

Referring to FIG. 6, the method 300 may further include detecting a communication type associated with the first frequency range via a modulation detection and waveform classification module upon the frequency detection sensor detecting radio frequency signal within the first frequency range, wherein the first frequency range is a frequency range of approximately 225-512 MHz and the communication type includes at least one of UHF AM, HAVEQUICK I, HAVEQUICK II, and Enhanced Position Location Reporting System 326.

Figure 7:
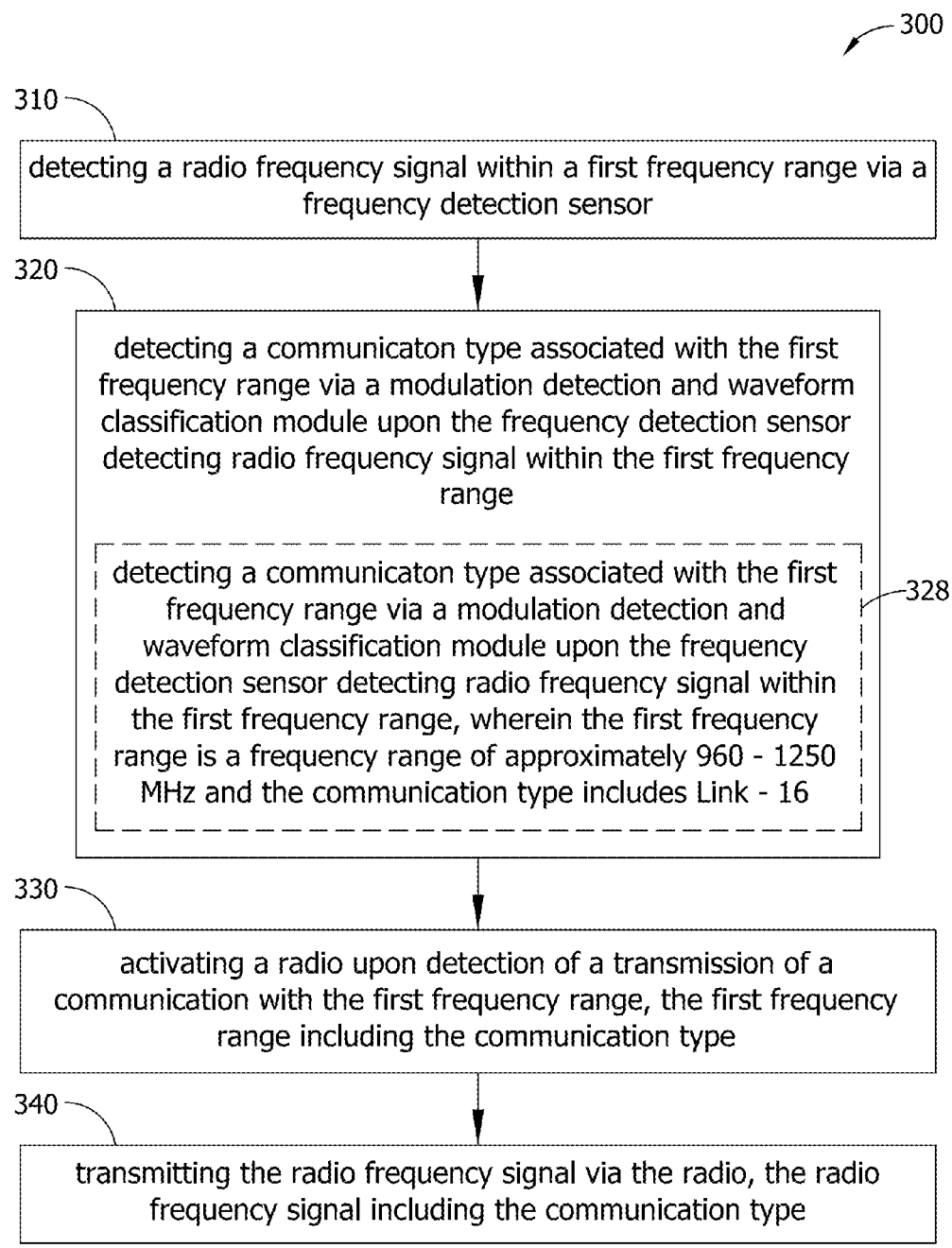

Referring to FIG. 7, the method 300 may further include detecting a communication type associated with the first frequency range via a modulation detection and waveform classification module upon the frequency detection sensor detecting radio frequency signal within the first frequency range, wherein the first frequency range is a frequency range of approximately 960-1060 MHz and the communication type includes Link-16, 328.

Figure 8:
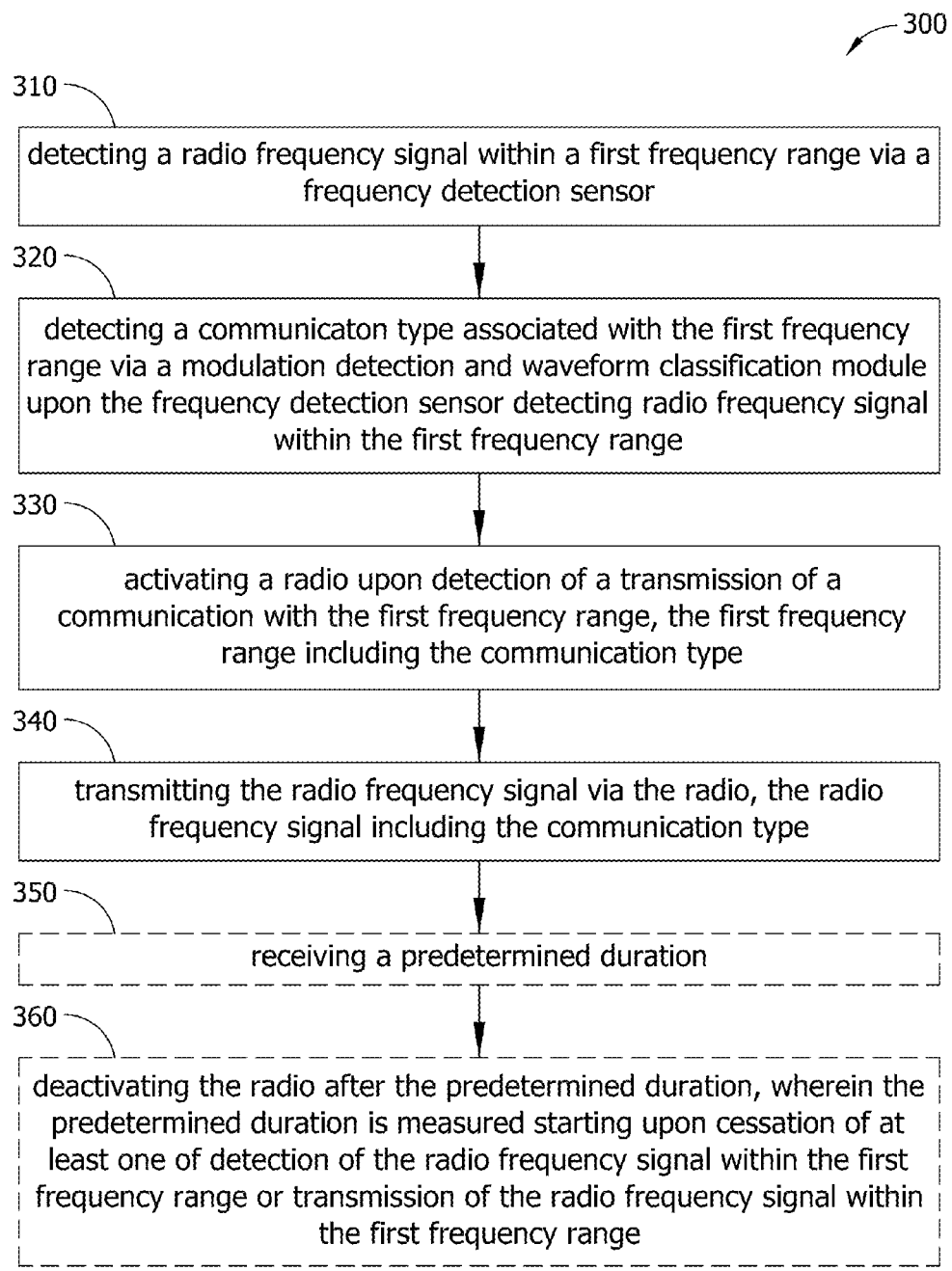

Referring to FIG. 8, the method 300 may further include receiving a predetermined duration 350 and deactivating the radio after the predetermined duration, wherein the predetermined duration is measured starting upon cessation of at least one of detection of the radio frequency signal within the first frequency range or transmission of the radio frequency signal within the first frequency range 360. The predetermined duration may include a time period pre-programmed by a user or a manufacturer.

It is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
a frequency detection sensor for detecting a radio frequency signal within a first frequency range, the frequency detection sensor configured for classifying at least one portion of the first frequency range as unoccupied, partially occupied, or totally occupied, the frequency detection sensor further configured for transmitting the radio frequency signal within the first frequency range including digitized contents of the at least one portion of the first frequency range when the at least one portion of the first frequency range is classified as partially occupied or totally occupied;
wherein the system is further configured to detect a communication type included in the first frequency range when the frequency detection sensor transmits the radio frequency signal including digitized contents of the at least one portion of the first frequency range; and
a radio for receiving and transmitting the radio frequency signal within the first frequency range including the detected communication type, the radio being configured to search for at least one radio frequency signal including the detected communication type when the radio is activated,
wherein the radio is inactive prior to detection of the communication type included in the radio frequency signal, and the radio is activated upon detection of the communication type included in the radio frequency signal,
wherein the radio is deactivated after a predetermined duration measured from cessation of at least one of detection of the radio frequency signal within the first frequency range including the detected communication type or transmission of the radio frequency signal within the first frequency range including the detected communication type.

2. The system of claim 1, wherein the radio further comprises a receive only channel and a simplex channel, the receive only channel and the simplex channel configured to receive and retransmit the radio frequency signal within the first frequency range including the detected communication type.

3. The system of claim 1, wherein the radio is deactivated after the a predetermined duration measured from cessation of detection of the radio frequency signal within the first frequency range including the detected communication type.

4. The system of claim 1, wherein the first frequency range is a frequency range of approximately 30-88 MHz and the communication type includes at least one of VHF FM and SINCGARS.

5. The system of claim 1, wherein the first frequency range is a frequency range of approximately 118-136 MHz and the communication type includes at least one of VHF AM and air traffic control communication.

6. The system of claim 1, wherein the first frequency range is a frequency range of approximately 225-512 MHz and the communication type includes at least one of UHF AM, HAVEQUICK I, HAVEQUICK II, and Enhanced Position Location Reporting System.

7. The system of claim 1, wherein the first frequency range is a frequency range of approximately 960-1206 MHz and the communication type includes Link-16.

8. A system, comprising:
an unmanned aerial device;
a frequency detection sensor coupled to the unmanned aerial device for detecting a radio frequency signal within a first frequency range, the frequency detection sensor configured for classifying at least one portion of the first frequency range as unoccupied, partially occupied, or totally occupied, the frequency detection sensor further configured for transmitting the radio frequency signal within the first frequency range including digitized contents of the at least one portion of the first frequency range when the at least one portion of the first frequency range is classified as partially occupied or totally occupied;
wherein the system is further configured to detect a communication type included in the first frequency range when the frequency detection sensor transmits the radio frequency signal including digitized contents of the at least one portion of the first frequency range; and
a radio for receiving and transmitting the radio frequency signal within the first frequency range including the detected communication type, the radio being configured to search, via a network identifier and a transmission security hopping key, for at least one radio frequency signal including the detected communication type when the radio is activated,
wherein the radio is inactive prior to detection of the communication type included in the radio frequency signal, and the radio is activated upon detection of the communication type included in the radio frequency signal,
wherein the radio is deactivated after a predetermined duration measured from cessation of at least one of detection of the radio frequency signal within the first frequency range including the detected communication type or transmission of the radio frequency signal within the first frequency range including the detected communication type.

9. The system of claim 8, wherein the radio further comprises a receive only channel and a simplex channel, the receive only channel and the simplex channel configured to receive and retransmit the radio frequency signal within the first frequency range including the detected communication type.

10. The system of claim 8, wherein the radio is deactivated after the predetermined duration from cessation of detection of the radio frequency signal within the first frequency range including the detected communication type.

11. The system of claim 8, wherein the first frequency range is a frequency range of approximately 30-88 MHz and the communication type includes at least one of VHF FM and SINCGARS.

12. The system of claim 8, wherein the first frequency range is a frequency range of approximately 118-136 MHz and the communication type includes at least one of VHF AM and air traffic control communication.

13. The system of claim 8, wherein the first frequency range is a frequency range of approximately 225-512 MHz and the communication type includes at least one of UHF AM, HAVEQUICK I, HAVEQUICK II, and Enhanced Position Location Reporting System.

14. The system of claim 8, wherein the first frequency range is a frequency range of approximately 960-1206 MHz and the communication type includes Link-16.

15. A method, comprising:
detecting a radio frequency signal within a first frequency range via a frequency detection sensor;
classifying at least one portion of the first frequency range as unoccupied, partially occupied, or totally occupied via the frequency detection sensor;
transmitting the radio frequency signal within the first frequency range including digitized contents of the at least one portion of the first frequency range via the frequency detection sensor when the at least one portion of the first frequency range is classified as partially occupied or totally occupied;
detecting a communication type included in the first frequency range when the frequency detection sensor transmits the radio frequency signal including digitized contents of the at least one portion of the first frequency range,
activating a radio upon detection of the communication type included in the first frequency range;
searching for at least one radio frequency signal including the detected communication type via the radio when the radio is activated;
receiving the radio frequency signal within the first frequency range via the radio, the radio frequency signal including the detected communication type via the radio;
transmitting the radio frequency signal within the first frequency range via the radio, the radio frequency signal including the detected communication type; and
deactivating the radio after a predetermined duration measured from cessation of at least one of detection of the radio frequency signal within the first frequency range including the detected communication type or transmission of the radio frequency signal within the first frequency range including the detected communication type.

16. The method of claim 15, wherein detecting a communication type included in the first frequency range when the frequency detection sensor transmits the radio frequency signal including digitized contents of the first frequency range includes:
detecting a communication type associated with the first frequency range upon the frequency detection sensor detecting radio frequency signal within the first frequency range, wherein the first frequency range is a frequency range of approximately 30-88 MHz and the communication type includes at least one of VHF FM and SINCGARS.

17. The method of claim 15, wherein detecting a communication type included in the first frequency range when the frequency detection sensor transmits the radio frequency signal including digitized contents of the first frequency range includes:
- detecting a communication type associated with the first frequency range upon the frequency detection sensor detecting radio frequency signal within the first frequency range, wherein the first frequency range is a frequency range of approximately 118-136 MHz and the communication type includes at least one of VHF AM and air traffic control communication.

18. The method of claim 15, wherein detecting a communication type included in the first frequency range when the frequency detection sensor transmits the radio frequency signal including digitized contents of the first frequency range includes:
- detecting a communication type associated with the first frequency range upon the frequency detection sensor detecting a radio frequency signal within the first frequency range, wherein the first frequency range is a frequency range of approximately 225-512 MHz and the communication type includes at least one of UHF AM, HAVEQUICK I, HAVEQUICK II, and Enhanced Position Location Reporting System.

19. The method of claim 15, wherein detecting a communication type included in the first frequency range when the frequency detection sensor transmits the radio frequency signal including digitized contents of the first frequency range includes:
- detecting a communication type associated with the first frequency range upon the frequency detection sensor detecting radio frequency signal within the first frequency range, wherein the first frequency range is a frequency range of approximately 960-1206 MHz and the communication type includes Link-16.

20. The method of claim 15, wherein the method further includes:
- deactivating the radio after the predetermined duration from cessation of detection of the radio frequency signal within the first frequency range.

* * * * *